(12) United States Patent
Rehman et al.

(10) Patent No.: US 8,038,279 B2
(45) Date of Patent: Oct. 18, 2011

(54) INK-JET INKS FOR NEUTRAL BLACK PRINTING

(75) Inventors: Zin Ur Rehman, Corvallis, OR (US); Mary E. Austin, Corvallis, OR (US); Sukanya Rengaswamy, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1157 days.

(21) Appl. No.: 11/799,199

(22) Filed: Apr. 30, 2007

(65) Prior Publication Data

US 2008/0266334 A1   Oct. 30, 2008

(51) Int. Cl.
*G01D 11/00* (2006.01)
(52) U.S. Cl. .......... 347/100; 347/95; 347/96; 106/31.27
(58) Field of Classification Search .......... 347/100, 347/95, 96, 101; 106/31.13, 31.27, 31.6; 523/160, 161
See application file for complete search history.

(56) References Cited

U.S. PATENT DOCUMENTS

| 6,558,459 | B2 | 5/2003 | Schut | |
|---|---|---|---|---|
| 2002/0121219 | A1* | 9/2002 | Stramel et al. | 106/31.27 |
| 2004/0216638 | A1* | 11/2004 | Rolly | 347/100 |
| 2004/0261658 | A1 | 12/2004 | Rehman | |
| 2005/0209366 | A1 | 9/2005 | Hermansky | |
| 2005/0235867 | A1 | 10/2005 | Jackson et al. | |
| 2005/0250869 | A1 | 11/2005 | Claes et al. | |
| 2007/0296786 | A1* | 12/2007 | Ham et al. | 347/100 |

FOREIGN PATENT DOCUMENTS

| EP | 1 491 594 | 12/2004 |
|---|---|---|
| EP | 1 593 718 | 11/2005 |

* cited by examiner

*Primary Examiner* — Manish S Shah

(57) ABSTRACT

Ink, ink sets, and methods of printing are provided. The inks can include an aqueous solvent system including from about 5 wt % to about 20 wt % organic co-solvent, from about 2 wt % to about 5 wt % black dye, and a dye selected from cyan, magenta, and yellow dyes. The ink can be formulated such that upon printing on a print medium, the printed ink or inks can maintain a neutral black, defined by a chroma value of less than 7. This neutral black can be maintained such that the printed ink or image has a chroma value of less than 7 for substantially all L* values ranging from about 7 to about 12.

45 Claims, No Drawings

INK-JET INKS FOR NEUTRAL BLACK PRINTING

BACKGROUND OF THE INVENTION

Color characteristics of dye-containing inks play an important role in the quality of the printed ink-jet image. Perceived color quality can be characterized using any one of several color space systems, such as CIELAB or Munsell, as is known in the art. With respect to Munsell color space, a given color is defined using three terms, namely Hue, Value or lightness, and Chroma. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). C*, or chroma, is a numerical representation of a* and b*. Additional terms such as h° (hue angle) are used to further describe a given color. A single ink-jet ink of a first color that has good chroma, gamut, hue angle, and lightfastness is not always optimal for use with other colors. In other words, not only does an individual color, i.e., cyan, magenta, or yellow, have to have acceptable color qualities, but the ink-set in which it is used also plays a role in whether the ink-jet ink performs in an acceptable manner. Further, it is difficult to formulate an ink or ink set that can be used to generate a black that reaches a low L* value that is also neutral black.

Accordingly, investigations continue into developing ink and ink set formulations that have acceptable color values.

DETAILED DESCRIPTION OF THE PREFERRED EMBODIMENT(S)

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used in this specification and the appended claims, the singular forms "a," "an," and "the" include plural referents unless the context clearly dictates otherwise. Thus, for example, reference to "an ink" includes one or more of such inks, reference to "an amount of dyes" includes reference to one or more amounts of dyes, and reference to "the ink set" includes reference to one or more ink sets.

"Chroma" or "C*" is used in its conventional usage consistent with the CIELAB definitions of color. Specifically, $$C^* = \sqrt{(a^*)^2 + (b^*)^2}.$$

As used herein, "liquid vehicle" or "ink vehicle" refers to the liquid fluid in which colorant is dispersed or dissolved to form an ink. Liquid vehicles are well known in the art, and a wide variety of ink vehicles may be used in accordance with embodiments of the present invention. Such liquid vehicles may include a mixture of a variety of different agents, including without limitation, surfactants, solvents, co-solvents, buffers, biocides, viscosity modifiers, sequestering agents, stabilizing agents, and/or water. The liquid vehicle can also carry other additives such as latex particulates and other polymers, UV curable materials, and/or plasticizers, in some embodiments.

As used herein, the term "neutral" when referring to an ink, an ink set, white paper, or photographic media, or terms such as "neutral ink" or "neutral ink set" refers to inks or ink sets where a* and b* values, and thus the C* or chroma value, for given black ink(s) are each close to 0 (zero) at a given L* value. Ideally, inks or ink sets will allow for the printing of neutral images on neutral white paper or photographic media along a substantial portion or the entire white to black (L*) ramp. "Neutral paper" refers to a paper having a* and b* values that are also each relatively close to 0. It is notable that people of different cultures and backgrounds view the color space differently, and thus, neutral coloring is somewhat subjective. One type of neutral paper is photographic paper, or photo paper. Such photographic paper can have an ink-receiving layer, such as a porous coating. Throughout the text, the use of paper, unless explicitly stated to the contrary, can include photographic and other coated paper, particularly porous coated paper. This being stated, in accordance with one embodiment of the present invention where grays and blacks are printed, acceptable a* values can range from about −1 to about 3.5, and acceptable b* values can range from about −3 to about 1. Thus, a white media sheet (L* approaching 100) that starts within these value ranges, and where the a*b* ranges can be maintained within these ranges when ramping up the printed ink from a very light gray image to a perceptibly black image (L* is approaching 0), is considered to be a neutral gray ramp along the entire L* axis.

As used herein, "ink" refers to a single liquid vehicle that contains at least one dye, and in accordance with embodiments of the present invention, certain key inks will include at least two dyes that can be used to print neutral grays and black.

As used herein, "dye" refers to the individual compound, complex, or molecule primarily responsible for the color of an ink, including dyes that affect the overall color of an ink, but which are not themselves the predominant color. For example, a black ink may contain several black dyes but may also contain a yellow dye and/or a magenta dye and/or a cyan dye which provides a more neutral black.

As used herein, "black ink" includes inks having a plurality of dyes that can be printed to generate perceptibly gray or black images, depending on the density at which the black ink is printed. This term includes inks containing black and non-black dyes, although the overall printed color generated using such inks would be referred to as gray or black by an ordinary viewer.

As used herein, "black dye" refers to any of a number of black dyes, such as Pacified Reactive Black 31, Direct Black 168, Ilford K1334, Acid Black 52, Direct Black 170, Direct Black 22, Direct Black 19, Direct Black IJ Dye, Reactive Black 8, Solvent Black 13, copper complexed azo black, and the like.

As used herein, "non-black dye" or "colored dye" refers to all other dyes that are not defined as black including, but not limited to, magenta dyes, yellow dyes, cyan dyes, blue dyes, red dyes, pink dyes, and the like.

As used herein, it is noted that discussion of "second" dyes, "third" dyes, "fourth" dyes, "fifth" dyes, etc., does not infer necessarily that that number of dyes is present in a single ink-jet ink. For example, an ink may include a first dye, a second dye, and a fifth dye (totaling three dyes). In an ink set discussion, a second ink-jet ink may include a third dye and a fourth dye (totaling two dyes). Further, a first black dye and a third black dye that are each present in two different ink sets may, in fact, be the same dye or different dyes. However, if a first black dye and a third black dye are described as being in a single ink, these dyes are necessarily different dyes. Still further, a dye described as a "first dye" in one embodiment should not necessarily necessitate an interpretation that a "first dye" in a second embodiment is the same.

As used herein, "plurality" refers to more than one. For example, a plurality of dyes refers to at least two dyes.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop inks, ink sets, and methods of printing that result in acceptable levels of neutrality when printing a perceptively black color—a color with a low L* value. In accordance with this, the present invention is drawn to neutral black inks and neutral black ink sets, as well as related methods. It is noted that when discussing a single ink, an ink set, or a method of printing herein, each of these discussions can be considered applicable to each of these embodiments, whether or not they are explicitly discussed in the context of that embodiment. Thus, for example, in discussing the dyes present in an ink-jet ink, those dyes can also be used in the ink set embodiments or the method of printing embodiments, and vice versa.

In a first embodiment, a neutral black ink can comprise an aqueous solvent system including from about 5 wt % to about 50 wt % organic co-solvent, about 2 wt % to about 5 wt % black dye and a non-black colored dye or a mixture of non-black colored dyes, e.g., cyan, magenta, yellow, or other color. Other embodiments can include additional dyes, such as another dye selected from cyan, magenta, yellow, or another color (not black). While the inks and ink sets are generally directed towards ink-jet printing applications, the inks can be used for a number of printing techniques. The neutrality of the black inks can be defined by the CIELAB color space, using the terms L*, a*, b* and C* as previously discussed, and as is generally recognized in the art as an effective method of characterizing color space. In accordance with this, the inks of the present invention can contain a combination of dyes and solvents such that, after printing on a print medium, the printed ink first reaches an L* value from about 7 and about 12, and the ink maintains a neutral color across the L* range from about 7 to about 12. In one embodiment, the neutral black can be defined by the printed ink or image having a C* value of less than about 7. In a more detailed aspect of this embodiment, the C* value across the same range can be less than about 6, or further still, less than about 4. In another embodiment, the printed ink can have an a* value from about −1.0 to about 3.5 for substantially all L* values which range from about 7 to about 12. In still another embodiment, the printed ink can have a b* value from about −3.0 to about 1.0 for L* values ranging from about 7 to about 12.

Each of the black inks described herein can include a dye selected from the group consisting of cyan, magenta, and yellow dyes. In one aspect, the dye can be cyan dye. In another embodiment, the dye can be magenta dye. And in still another embodiment, the dye can be yellow dye. In one aspect, more than one dye can be selected from the group of cyan, magenta, and yellow dyes. For example, two dyes can be selected (e.g. yellow and cyan, magenta and yellow, etc.). All three dyes may be selected so that the ink includes cyan dye, magenta dye and yellow dye. Additional dyes of the same color can also be used. For example, the ink can include more than one yellow dye.

The ink includes from about 2 wt % to about 5 wt % black dye. Such black dye can consist essentially of a single black dye, or can be the sum of more than one black dye. The black dyes in any of the embodiments described herein can include, but are not limited to, Pacified Reactive Black 31; Direct Black 168; Ilford K1334; Acid Black 52; Direct Black 170; Direct Black 22; Direct Black 19; Direct Black IJ Dye; Reactive Black 8; Solvent Black 13; 1H-Pyrazole-3-carboxylic acid, 4-[[6-[[4-[(1,5-disulfo-2-naphthalenyl) azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt (Experimental Black 1); 2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy)phenyl]azo]-4,5-dihydroxy-, potassium sodium salt (Experimental Black 2); copper complexed azo black; and the like.

For example, the black dye can be present in the ink from about 2 wt % to about 5 wt %. In one aspect, the black dye can be present at from about 2 wt % to about 4 wt %, or further about 2 wt % to about 3 wt %. When the ink contains multiple black dyes, multiple black dyes can be present collectively at from about 2 wt % to about 5 wt %. For example, in one embodiment, an ink composition can contain a first black dye from about 1.5 wt % to about 2 wt % and a second black dye from about 0.5 wt % to about 3 wt %. Alternatively, the black dyes can be present in equal amounts or one black dye may be present in a considerably higher concentration.

Whether one or more black dyes are present, other dyes can also be present within the black ink. For example, a yellow dye can be present. Typically, yellow dyes can be present at an amount of from about 1 wt % to about 4 wt %. Additionally or alternatively, magenta dye can be present. Typically, magenta dye can be present in black ink at from about 0.1 wt % to about 2 wt %. Further, cyan dye can be present in the black ink. Typically, cyan dye can be present in an amount from about 0.5 wt % to about 3 wt %.

Regarding the yellow dye, if present, any acceptable yellow dye can be used that promotes neutrality in the ink, including Yellow 104, Yellow 1189, Acid Yellow 17, Acid Yellow 23, Direct Yellow 132, and Direct Yellow 86. Use of yellow dye can provide greater neutrality to the ink. Regarding the magenta dye, if present, any of a number of magenta dyes can be used that promotes neutrality, including Acid Red 52; Ilford M377; Reactive Red 23; Acid Red 289; 6-Benzothiazolesulfonic acid; 2-[4-cyano-3-(1,1-dimethylethyl)-5-[[4-methyl-6-[(6-sulfo-2 benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl]potassium sodium salt (Experimental Magenta 1); 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (Experimental Magenta 2); and Hydrolyzed Reactive Red 180. Magenta dye, besides assisting in ink neutrality, can also provide improved qualities such as light fastness, light fade, ozone fade, and/or water fastness. Regarding the cyan dye, if present, any of a number of cyan dyes can be used that promotes neutrality, including azomethine dyes, polymethine dyes, and copper phthalocyanine dyes such as C.I. Direct Blue 86, 87, 199 and dyes represented by:

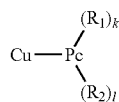

Wherein $R_1=SO_2(CH_2)_3SO_3Li$, $k=3$, $R_2=SO_2(CH_2)_3SO_2NHCH_2CH(OH)CH_3$, and $l=1$. Such inks of this structure are called herein Experimental Cyan 1. Cyan dye can improve water fastness and ozone fade.

The ink(s) can contain black dye(s) in various weight percentages to achieve the neutrality in accordance with embodiments of the present invention. Often times to reach a low L* value (indicating closer to true black), large amounts of dye, particularly black dye, must be added to the ink. The additional dye can significantly increase the cost of the ink. Alternatively, an ink or various inks can be printed repeatedly over the same area until a darker image is reached. This too can be costly and does not use the dye in the most efficient or economical manner, and may further have adverse effects on the printing medium. The present invention relies on the solvent system to allow for a neutral black ink which can produce low L* values and still use, when compared to similar inks, moderate to low levels of the black dye. In some aspects, the total amount of dye and/or number of dyes included in the ink can be less than comparative dyes.

The solvent system of the present invention is aqueous based and can include from about 5 wt % to about 20 wt % organic co-solvent. In one aspect, the aqueous co-solvent can range from about 5 wt % to about 14 wt %. In a further aspect, the aqueous co-solvent can range from about 5 wt % to about 12 wt %, or even from 5 wt % to about 10 wt %. Co-solvents which may be used are any that, either alone or in combination at the proper values, allows for printing of a neutral black as herein defined.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1-6-alcohols, ethylene glycol alkyl ethers, propylene glycol alkyl ethers, higher homologs of polyethylene glycol alkyl ethers, substituted and unsubstituted lactams, N-alkyl caprolactams, unsubstituted caprolactams, both substituted and unsubstituted formamides, both substituted and unsubstituted acetamides, and the like. Specific examples of solvents that can be used include trimethylol propane, 2-pyrrolidinone, and/or 1,5-pentanediol. Although other co-solvents can be used in addition to or alternatively, one, two or all three of the aforementioned co-solvents may be used in the ink in any combination. In one aspect, trimethylol propane can be used. Typically, trimethylol propane can be used in an amount of less than about 5 wt % of the overall ink weight. In another aspect, 2-pyrrolidinone can be used as a co-solvent. Usually, 2-pyrrolidinone is used in amounts less than about 8 wt %. In still a further aspect, 1,5-pentanediol can be used as a co-solvent. As with the 2-pyrrolidinone, 1,5-pentanediol is typically present in amounts less than about 8 wt %. As mentioned, any combination of the three exemplary co-solvents can be used. For example, 2-pyrrolidinone and 1,5-pentanediol, or 1,5 pentanediol and trimethylol propane, etc, can be used in the ink. Further, all three (trimethylol propane, 2-pyrrolidinone, and 1,5-pentanediol) can be used in the same ink. In one embodiment, the three noted co-solvents can be the only co-solvents present in the ink. Relying on the advanced aqueous solvent system described herein allows for a decreased amount of dye used to attain not only a low L* value printed ink, but one that is neutral.

It is noted that the present invention is not only drawn to methods of printing and specific inks, but to ink sets. As such, one or more inks as previously described can be included in a set, along with additional inks. In one aspect, the additional inks can be colored inks. Thus, an ink set can include an ink selected from the group of cyan ink, magenta ink, and yellow ink, and can further include a black ink with an aqueous solvent system with from about 5 wt % to about 20 wt % organic co-solvent, and from about 2 wt % to about 5 wt % black dye. The black ink can also include a dye selected from cyan, magenta, and/or yellow dye. Upon printing the black ink on a print medium to form a printed image, the printed image can be neutral black. The neutral black can be defined by the printed image attaining an L* value of from about 7 to about 12, and further having a chroma, or C* value, of less than 7 over the L* range of from about 7 to about 12. The ink set can contain a combination of inks that include dyes at specific weights such that after printing on a print medium, the printed ink maintains a neutral color. In one aspect, the C* value can be less than 6. In another embodiment, the a* value can be from about −1.0 to about 3.5 and/or the b* value can be from about −3.0 to about 1.0 for all L* values ranging from about 7 to about 12.

The ink set can further include a second black ink. The black dyes of an ink set can include any of those previously described. For an individual ink, describing the ink as containing a plurality of black dyes must by necessity mean that the black dyes are different for that particular ink. However, when describing an ink set as containing a plurality of black dyes, the ink set does not require that the black dyes are different, as the same black dye may be present in each individual ink. As such, the ink sets of the present invention may contain black dyes that are the same, different, or contain a common black dye(s) in addition to a different black dye(s).

The black ink(s) of the present invention can contain non-black dyes. The non-black dyes of the ink set may include magenta dye, a yellow dye, a cyan dye, blue dye, pink dye, red dye, or the like. With respect to the cyan dye, the yellow dye or the magenta dye, those described above are suitable for use, as well as other similar dyes. With respect to the dyes of other colors, any dye suitable for obtaining neutral blacks can also be used. Third, fourth, fifth, sixth, etc., dyes of any color can also be present in the ink set, as may be desirable to obtain neutral black.

Like the inks, the ink sets of the present invention can contain black dyes and other dyes at various weight percentages to achieve neutral printed ink in accordance with the embodiments of the present invention.

In addition to the inks and ink sets described above, a method of printing a neutral black image on a print medium can comprise ink-jetting an ink on a print medium to form a printed image. The ink can comprise from about 2 wt % to about 5 wt % black dye, a dye selected from cyan, magenta, and/or yellow, and an aqueous solvent system including from about 5 wt % to about 20 wt % organic co-solvent. In this embodiment, after printing on the print medium, the printed image is neutral black, as defined by the printed ink attaining an L* value of from about 7 to about 12, and further having a C* value of less than 7 across the noted L* range. In one embodiment, the print medium can be a neutral print medium. A neutral print medium is defined as having an a* value from about −1 to about 3, and a b* value from about 3 to about −15, and an L* value of from about 90 to about 100.

Additionally, the method can include ink-jetting a colored ink onto the print medium to create a composite image, or alternatively ink-jetting a colored ink onto the print medium to enhance or otherwise alter the black ink (i.e. decrease the C* value of the overall image). Likewise, the method can include ink-jetting more than one colored ink onto the print medium to create a full-color image. Alternatively, the more than one colored ink (i.e. 2, 3, 4, etc. colored inks) can be used to enhance or otherwise adjust the black ink image on the medium. Such colored inks can be selected from any colored inks, which may include cyan ink, magenta ink, and yellow ink.

In each of the above embodiments, typical ink formulations that can be used with the inks, ink sets, and methods of the present invention can include one or more non-ionic, cationic, and/or anionic surfactant can also be present, and if present, can be included at from 0.01 wt % to 10.0 wt %. Other ink components known in the art such as biocides, viscosity modifiers, materials for pH adjustment, sequestering agents, preservatives, latexes, polymers, and the like, can also be present.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union Carbide Corp.), Vancide (R. T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, of either of these components can be used. Viscosity modifiers and buffers may also be present, as well as other additives known to those skilled in the art to modify properties of the ink as desired. Such additives can be present at from 0.01% to 20% by weight.

EXAMPLES

The following examples illustrate various aspects of the inks and ink sets in accordance with embodiments of the present invention. The following examples should not be considered as limitations of the invention, but should merely teach how to make the best coatings, reflecting the present invention.

Example 1

Neutral Ink 1

An ink-jet ink composition is prepared in accordance with Table 1, as follows:

TABLE 1

| Component | Wt % |
| --- | --- |
| Trimethylol propane | 2-5% |
| 2-pyrrolidinone | 6-8% |
| 1,5-pentanediol | 1-3% |
| Experimental Black 1 | 2-3% |
| Experimental Magenta 1 | 0.1-0.9% |
| Experimental Cyan 1 | 1-2% |
| Yellow dye Y104 | 2-3% |
| Biocide | 0.01-0.3% |
| Surfactant | 0.01-0.7% |
| Buffer | 0.1-0.4% |
| EDTA | 0.01-0.3% |
| Water | balance |

The combination of the noted components, within the designated weight percent ranges, produces a neutral black ink.

Example 2

Neutral Ink 2

An ink-jet ink composition is prepared in accordance with Table 2, as follows:

TABLE 2

| Component | Wt % |
| --- | --- |
| Trimethylol propane | 3-5% |
| 2-pyrrolidinone | 1-3% |
| 1,5-pentanediol | 1-3% |
| Experimental Black 1 | 2-3% |
| Experimental Magenta 1 | 0.1-0.9% |
| Experimental Cyan 1 | 1-2% |
| Yellow dye Y104 | 2-3% |
| Biocide | 0.01-0.3% |
| Surfactant | 0.01-0.7% |
| Buffer | 0.1-0.4% |
| EDTA | 0.01-0.3% |
| Water | balance |

The combination of the noted components, within the designated weight percent ranges, produces a neutral black ink.

Example 3

Neutral Ink 3

An ink-jet ink composition is prepared in accordance with Table 3, as follows:

TABLE 3

| Component | Wt % |
|---|---|
| Trimethylol propane | 2-5% |
| 2-pyrrolidinone | 5.5-7.5% |
| 1,5-pentanediol | 5.5-7.5% |
| Experimental Black 1 | 2-3% |
| Experimental Magenta 1 | 0.1-0.9% |
| Experimental Cyan 1 | 1-2% |
| Yellow dye Y104 | 2-3% |
| Biocide | 0.01-0.3% |
| Surfactant | 0.01-0.7% |
| Buffer | 0.1-0.4% |
| EDTA | 0.01-0.3% |
| Water | balance |

The combination of the noted components, within the designated weight percent ranges, produces a neutral black ink.

Example 4

Neutral Ink 4

An ink-jet ink composition is prepared in accordance with Table 4, as follows:

TABLE 4

| Component | Wt % |
|---|---|
| Trimethylol propane | 2-5% |
| 2-pyrrolidinone | 1-3% |
| 1,5-pentanediol | 6-8% |
| Experimental Black 1 | 2-3% |
| Experimental Magenta 1 | 0.1-0.9% |
| Experimental Cyan 1 | 1-2% |
| Yellow dye Y104 | 2-3% |
| Biocide | 0.01-0.3% |
| Surfactant | 0.01-0.7% |
| Buffer | 0.1-0.4% |
| EDTA | 0.01-0.3% |
| Water | balance |

Example 5

Control Ink

An ink-jet ink composition is prepared in accordance with Table 5, as follows:

TABLE 5

| Component | Wt % |
|---|---|
| Trimethylol propane | 10-12% |
| 2-pyrrolidinone | 10-12% |
| 1,5-pentanediol | 10-12% |
| Experimental Black 1 | 2-3% |
| Experimental Magenta 1 | 0.1-0.9% |
| Experimental Cyan 1 | 1-2% |
| Yellow dye Y104 | 2-3% |
| Biocide | 0.01-0.3% |
| Surfactant | 0.01-0.7% |
| Buffer | 0.1-0.4% |
| EDTA | 0.01-0.3% |
| Water | balance |

The combination of the noted components, within the designated weight percent ranges, produces an ink which is neutral but has an L*min which is high.

Example 6

Test Data

Inks formulated according to Examples 1-5 were printed onto HP Advance Photopaper by means of HP Deskjet 6540 printer. The minimum L* value was measured and the C* value at the minimum L* value was noted. Results are in Table 6.

TABLE 6

| Ink | Minimum L* | C* at min L* |
|---|---|---|
| Example 1 | 8.0 | 5.6 |
| Example 2 | 7.5 | 5.8 |
| Example 3 | 8.0 | 5.8 |
| Example 4 | 7.7 | 5.8 |
| Example 5 | 13 (bad) | 2 |

Example 7

Test Data 2

Inks formulated according to Examples 1-5 were printed onto a neutral white print medium along with color inks cyan, magenta, and yellow. The minimum L* value was measured and the C* value at the minimum L* value was noted. Results are in Table 7.

TABLE 7

| Ink | Minimum L* | C* at min L* |
|---|---|---|
| Example 1 | 9.4 | 3.2 |
| Example 2 | 9.3 | 3.3 |
| Example 3 | 10.0 | 1.8 |
| Example 4 | 8.9 | 3.7 |
| Example 5 | 16 (bad) | 6 |

It should be noted that the control ink of Example 5 illustrates an acceptable C* at min L* value, but the minimum L* value is above the allowed range. Both the L* and Chroma values need to meet the levels claimed herein to show the desired improvement.

It is to be understood that the above-described formulations and arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An ink-jet ink, comprising:
   a) an aqueous solvent system including from about 5 wt % to about 50 wt % organic co-solvent;
   b) from about 2 wt % to about 5 wt % black dye; and
   c) a non-black, colored dye or a mixture of non-black colored dyes;
   wherein after printing the ink on a medium, the printed ink is neutral black, said neutral black defined by the printed ink having a chroma (C*) value of less than 7 for substantially all L* values which range from about 7 to about 12.

2. The ink jet ink of claim 1, wherein the organic co-solvent includes trimethylol propane.

3. The ink jet ink of claim 2, wherein the trimethylol propane is present in an amount of less than 5 wt %.

4. The ink-jet ink of claim 1, wherein the organic co-solvent includes 2-pyrrolidinone.

5. The ink-jet ink of claim 4, wherein the 2-pyrrolidinone is present in an amount of less than about 8 wt %.

6. The ink-jet ink of claim 1, wherein the organic co-solvent includes 1,5-pentanediol.

7. The ink-jet ink of claim 6, wherein the 1,5-pentanediol is present in an amount of less than about 8 wt %.

8. The ink jet ink of claim 1, wherein the ink includes two co-solvents selected from the group consisting of trimethylol propane, 2-pyrrolidinone, and 1,5 pentanediol.

9. The ink jet ink of claim 8, wherein the ink includes trimethylol propane, 2-pyrrolidinone, and 1,5-pentanediol.

10. The ink jet ink of claim 9, wherein the chroma (C*) value is less than 6.

11. The ink jet ink of claim 10, wherein the chroma (C*) value is less than 4.

12. The ink jet ink of claim 1, wherein the printed ink has an a* value of from about −1.0 to about 3.5 for substantially all L* values which range from about 7 to about 12.

13. The ink-jet ink of claim 1, wherein the printed ink has a b* value of from about −3.0 to about 1.0 for substantially all L* values which range from about 7 to about 12.

14. The ink jet ink of claim 13, wherein the printed ink has an a* value of from about −1.0 to about 3.5 for substantially all L* values which range from about 7 to about 12, and further has a b* value of from about −3.0 to about 1.0 for substantially all L* values which range from about 7 to about 12.

15. The ink jet ink of claim 1, including a cyan dye.

16. The ink jet ink of claim 1, including a magenta dye.

17. The ink jet ink of claim 1, including a yellow dye.

18. The ink jet ink of claim 1, including two dyes selected from the group consisting of cyan, magenta, and yellow.

19. The ink jet ink of claim 18, including cyan dye, magenta dye, and yellow dye.

20. The ink jet ink of claim 1, wherein the about 2 wt % to about 5 wt % black dye includes more than one black dye.

21. An ink set, comprising:
 a) an ink selected from the group consisting of cyan ink, magenta ink, and yellow ink; and
 b) a black ink including an aqueous solvent system with from about 5 wt % to about 20 wt % organic co-solvent, from about 2 wt % to about 5 wt % black dye, and a dye selected from the group of cyan, magenta, yellow, and mixtures thereof, such that after printing on a print medium, the printed image is neutral black, said neutral black defined by the printed ink having a chroma (C*) value of less than 7 for substantially all L* values which range from about 7 to about 12.

22. The ink set of claim 21, wherein the ink is the cyan ink.

23. The ink set of claim 21, wherein the ink is the magenta ink.

24. The ink set of claim 21, wherein the ink is the yellow ink.

25. The ink set of claim 21, wherein two inks are selected from the group consisting of cyan ink, magenta ink, and yellow ink.

26. The ink set of claim 25, comprising a cyan ink, a magenta ink, and a yellow ink.

27. The ink set of claim 21, further comprising a second black ink.

28. The ink set of claim 21, wherein the organic co-solvent includes a co-solvent selected from the group consisting of trimethylol propane, 2-pyrrolidinone, and 1,5 pentanediol.

29. The ink set of claim 28, wherein the organic co-solvent includes trimethylol propane present in the ink at a quantity of less than 5 wt %.

30. The ink set of claim 28, wherein the organic co-solvent includes 2-pyrrolidinone present in the ink at a quantity of less than 8 wt %.

31. The ink set of claim 28, wherein the organic co-solvent includes 1,5 pentanediol present in the ink at a quantity of less than 8 wt %.

32. The ink set of claim 21, wherein the chroma (C*) value is less than about 6.

33. The ink set of claim 21, wherein the printed ink has an a* value of from about −1.0 to about 3.5 for substantially all L* values which range from about 7 to about 12.

34. The ink set of claim 21, wherein the printed ink has a b* value of from about −3.0 to about 1.0 for substantially all L* values which range from about 7 to about 12.

35. The ink set of claim 34, wherein the printed ink has an a* value of from about −1.0 to about 3.5 for substantially all L* values which range from about 7 to about 12, and further has a b* value of from about −3.0 to about 1.0 for substantially all L* values which range from about 7 to about 12.

36. A method of printing a neutral black image on a print medium, comprising ink-jetting an ink jet ink on to the print medium to form a printed image, said ink jet ink including an aqueous solvent system including from about 5 wt % to about 20 wt % organic co-solvent, from about 2 wt % to about 5 wt % black dye, and a dye selected from the group of cyan, magenta, yellow, and mixtures thereof, such that after printing on the print medium, the printed image is neutral black, said neutral black defined by the printed ink having a chroma (C*) value of less than 7 for substantially all L* values which range from about 7 to about 12.

37. The method of claim 36, wherein the print medium is a neutral print medium, said neutral print medium having an a* value from about −1 to about 3, a b* value from about 3 to about −15, and an L* value from about 90 to about 100.

38. The method of claim 36, further comprising ink jetting a colored ink onto the print medium to create a composite image.

39. The method of claim 38, further comprising ink-jetting more than one colored ink onto the print medium to create a full-color image.

40. The method of claim 38, wherein the colored ink is selected from the group consisting of cyan ink, magenta ink, and yellow ink.

41. The method of claim 36, wherein the organic co-solvent includes a co-solvent selected from the group consisting of trimethylol propane, 2-pyrrolidinone, and 1,5 pentanediol.

42. The method of claim 36, wherein the chroma (C*) value is less than about 6.

43. The method of claim 36, wherein the printed ink has an a* value of from about −1.0 to about 3.5 for substantially all L* values which range from about 7 to about 12.

44. The method of claim 36, wherein the printed ink has a b* value of from about −3.0 to about 1.0 for substantially all L* values which range from about 7 to about 12.

45. The method of claim 44, wherein the printed ink has an a* value of from about −1.0 to about 3.5 for substantially all L* values which range from about 7 to about 12, and further has a b* value of from about −3.0 to about 1.0 for substantially all L* values which range from about 7 to about 12.

* * * * *